US006871719B2

(12) United States Patent
Breese et al.

(10) Patent No.: US 6,871,719 B2
(45) Date of Patent: Mar. 29, 2005

(54) DRIVE TRAIN MEMBER HAVING CONVEX SPLINES

(75) Inventors: Douglas E. Breese, Walbridge, OH (US); Mark S. Williams, Swanton, OH (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/036,076

(22) Filed: Dec. 27, 2001

(65) Prior Publication Data

US 2003/0125116 A1 Jul. 3, 2003

(51) Int. Cl.[7] .............................................. B60K 17/344
(52) U.S. Cl. ...................................... 180/248; 464/159
(58) Field of Search ................................ 464/154, 156, 464/158, 159; 180/248; 74/665 G (56) References Cited

U.S. PATENT DOCUMENTS

| | | | |
|---|---|---|---|
| 3,292,390 A | * 12/1966 | Wildhaber | ................... 464/158 |
| 3,698,524 A | 10/1972 | Schubert | |
| 3,892,300 A | 7/1975 | Hapeman et al. | |
| 3,953,158 A | * 4/1976 | Uppal | ..................... 464/158 X |
| 4,388,838 A | 6/1983 | Richards et al. | |
| 4,493,404 A | 1/1985 | Wenker | |
| 4,597,476 A | 7/1986 | Wenker | |
| 4,969,371 A | * 11/1990 | Allen | ..................... 464/158 X |
| 5,558,174 A | 9/1996 | Avitan et al. | |
| 5,613,914 A | 3/1997 | Gleasman et al. | |
| 5,647,802 A | 7/1997 | Gleasman et al. | |
| 5,878,492 A | 3/1999 | Gleasman et al. | |
| 5,911,286 A | * 6/1999 | Boutin | ................... 464/158 X |
| 6,123,518 A | 9/2000 | Zakula, Sr. et al. | |
| 6,155,395 A | * 12/2000 | Braford, Jr. | |

* cited by examiner

*Primary Examiner*—Greg Binda
(74) *Attorney, Agent, or Firm*—MacMillan, Sobanski & Todd, LLC (57) ABSTRACT

A vehicle drive train assembly includes a source of rotational power and at least one rotatably driven vehicle wheel. A male splined member and a female splined member are connected between the source of rotational power and the vehicle wheel to transmit rotational power therebetween. At least one of the splined members is a driveshaft. The splines of the male splined member have side surfaces and outer surfaces which are convex in shape. The convex splines of the male splined member cooperate with the splines of the female splined member to connect the splined members together in a manner that allows for limited angular and axial movement therebetween.

4 Claims, 7 Drawing Sheets

DRIVE TRAIN MEMBER HAVING CONVEX SPLINES

BACKGROUND OF THE INVENTION

This invention relates in general to vehicle drive train assemblies for transferring rotational power, such as from an engine to an axle assembly of the vehicle. In particular, this invention relates to a drive train member such as a driveshaft having convex splines.

In most land vehicles in use today, a drive train assembly is provided for transmitting rotational power from an engine/transmission assembly to one or more wheels of the vehicle. In a rear-wheel drive vehicle, a typical drive train assembly includes a tubular driveshaft which is connected between an output shaft of the transmission and an input shaft of a rear axle assembly to rotatably drive the rear wheels. In a front-wheel drive vehicle, a typical drive train assembly includes right and left halfshafts which are connected between a transaxle assembly and the right and left wheels, respectively.

Figure 10:
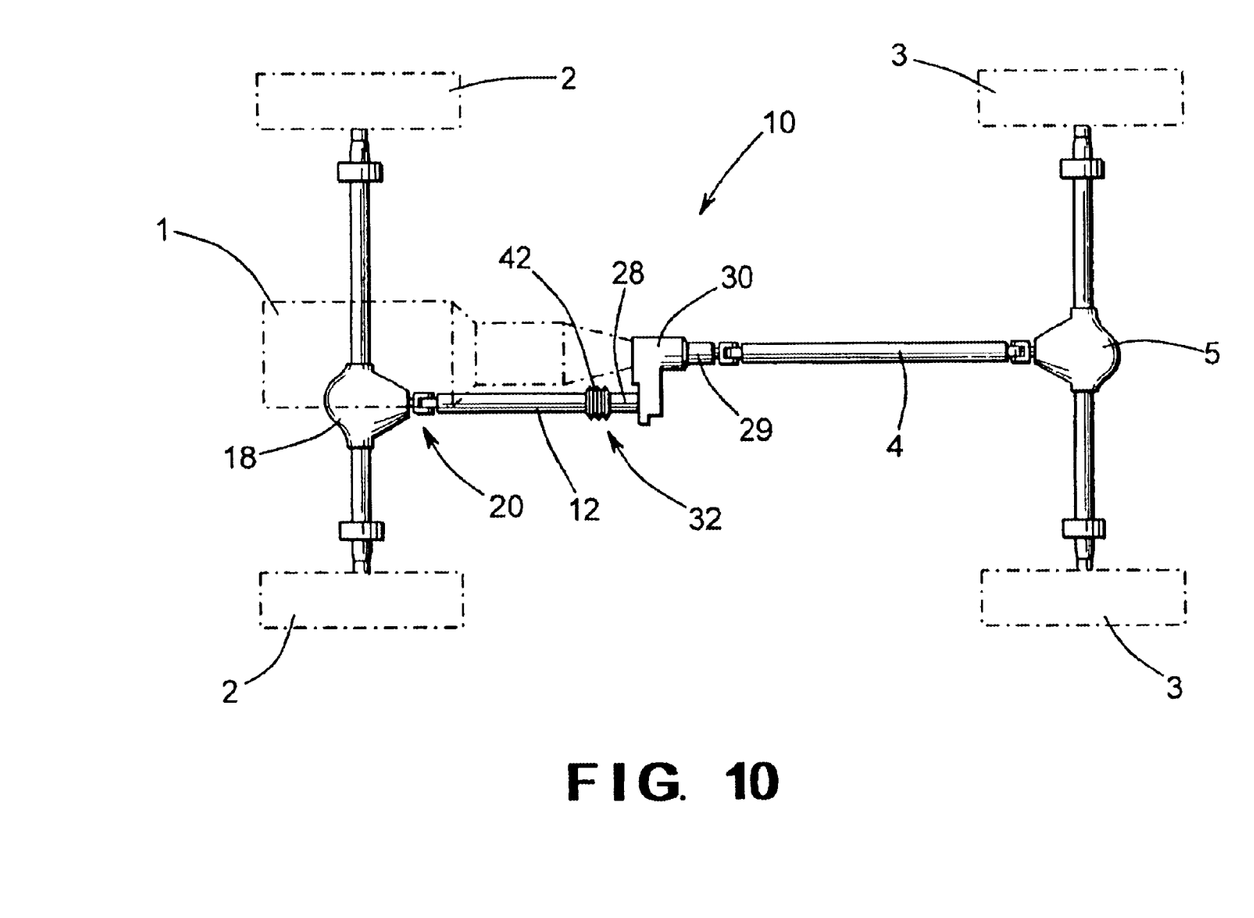
FIG. 10 is a schematic plan view of a vehicular drive train assembly including a transfer case in accordance with this invention.

In a four-wheel drive vehicle, such as shown in FIG. 10, a typical drive train assembly includes a transfer case which rotatably supports an input shaft for receiving rotational power from the engine/transmission assembly, as well as front and rear output shafts for transferring rotational power from the input shaft to the front and rear wheels of the vehicle, respectively. Typically, a front auxiliary driveshaft is connected between the front output shaft of the transfer case and an input shaft of a front axle assembly to rotatably drive the front wheels, and a rear driveshaft is connected between the rear output shaft of the transfer case and an input shaft of the rear axle assembly to rotatably drive the rear wheels. In some vehicles, the transfer case is spaced apart from the transmission, and a front driveshaft is connected between the output shaft of the transmission and the input shaft of the transfer case.

The different shafts are usually connected together by the use of universal joints. For example, a first universal joint is usually connected between the front output shaft of the transfer case and a first end of the front auxiliary driveshaft, and a second universal joint is connected between a second end of the front auxiliary driveshaft and the input shaft of the front axle assembly. The universal joints provide a rotational driving connection from the front output shaft of the transfer case through the front auxiliary driveshaft to the input shaft of the front axle assembly, while accommodating a limited amount of angular misalignment between the rotational axes of these three shafts. The use of universal joints to connect both ends of a driveshaft increases the complexity and cost of the drive train assembly.

SUMMARY OF THE INVENTION

This invention relates to a vehicle drive train assembly which includes a source of rotational power and at least one rotatably driven vehicle wheel. A male splined member and a female splined member are connected between the source of rotational power and the vehicle wheel to transmit rotational power therebetween. At least one of the splined members is a driveshaft. The splines of the male splined member have side surfaces and outer surfaces which are convex in shape. The convex splines of the male splined member cooperate with the splines of the female splined member to connect the splined members together in a manner that allows for limited angular and axial movement therebetween. The angular movement is caused at least in part by up or down movement of the vehicle wheel during operation of the vehicle.

In another embodiment, the invention relates to a vehicle drive train assembly which includes a source of rotational power and at least one rotatably driven vehicle wheel. A male splined driveshaft and a female splined member are connected between the source of rotational power and the vehicle wheel to transmit rotational power therebetween. The driveshaft includes a main tubular portion, a male splined end portion, and a neck portion therebetween. The neck portion has a diameter which is less than the diameters of both the male splined end portion and the main tubular portion. The splines of the male splined member have side surfaces and outer surfaces which are convex in shape. The convex splines of the male splined member cooperate with the splines of the female splined member to connect the splined members together in a manner that allows for limited angular and axial movement therebetween.

In a further embodiment, the invention relates to a vehicle drive train assembly which includes a source of rotational power and at least one rotatably driven vehicle wheel. A male splined member and a female splined member are connected between the source of rotational power and the vehicle wheel to transmit rotational power therebetween. At least one of the splined members is a driveshaft which is located completely outside of the source of rotational power. The splines of the male splined member have side surfaces and outer surfaces which are convex in shape. The convex splines of the male splined member cooperate with the splines of the female splined member to connect the splined members together in a manner that allows for limited angular and axial movement therebetween.

DETAILED DESCRIPTION OF THE INVENTION

Figure 1:
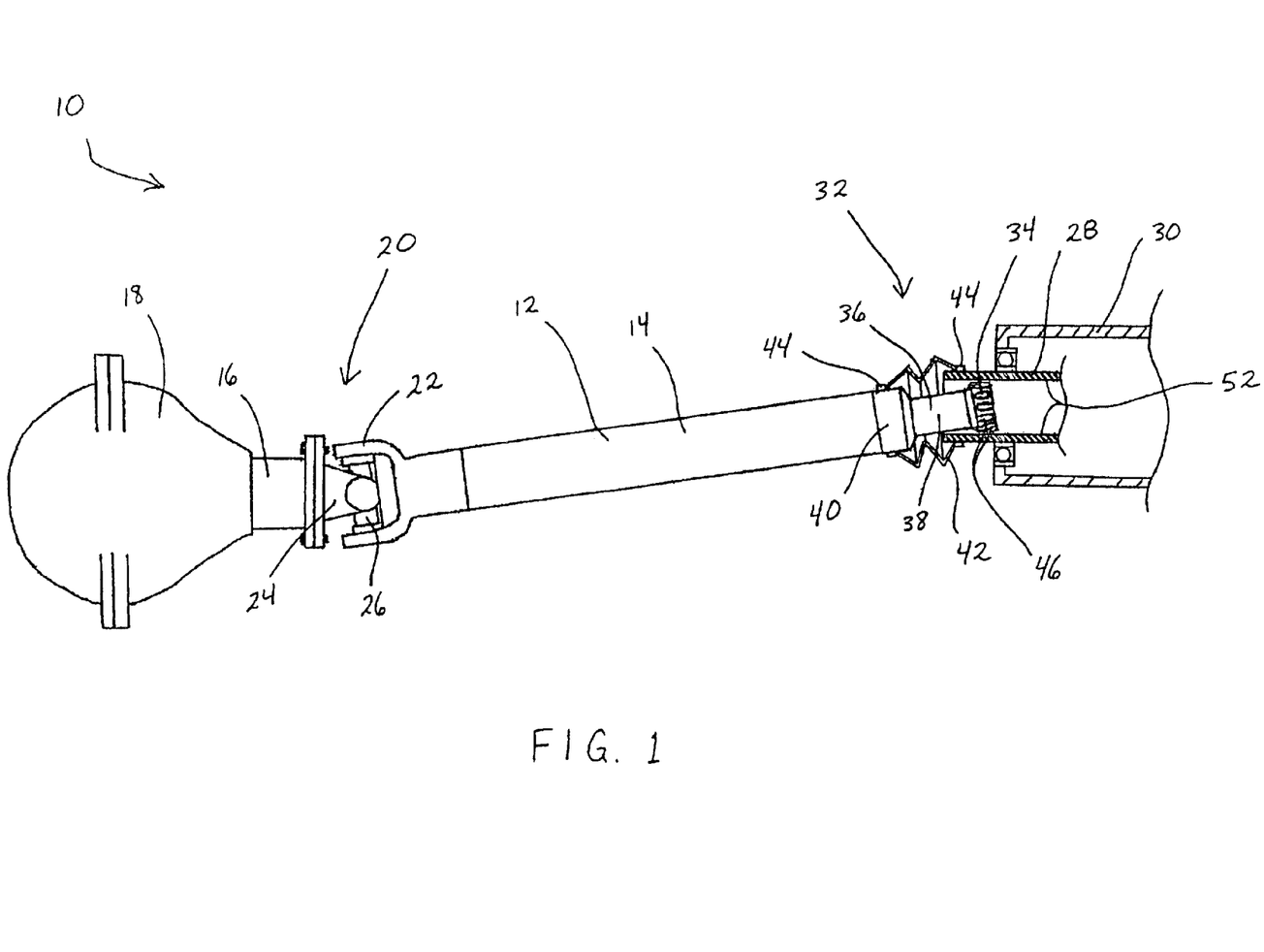
FIG. 1 is a side elevational view, partly in cross-section, of a front auxiliary driveshaft connected between a front output shaft of a transfer case and an input shaft of a front axle assembly, the driveshaft including an end piece having convex splines in accordance with the invention.

Referring now to the drawings, there is illustrated in FIG. 1 several members of a vehicle drive train assembly, indicated generally at 10. The illustrated drive train members are part of the drive train assembly of a four-wheel drive vehicle, such as schematically illustrated in FIG. 10. The drive train assembly 10 is provided for transmitting rotational power from an engine/transmission assembly 1 to one or more wheels 2 and 3 of the vehicle. The illustrated drive train assembly 10 includes a transfer case 30 that rotatably supports an input shaft (not shown) for receiving rotational power from the engine/transmission assembly 1, as well as front and rear output shafts 28 and 29, respectively, for transferring rotational power from the input shaft to the front and rear wheels 2 and 3 of the vehicle, respectively. In a manner that is described further below, a front auxiliary driveshaft 12 is connected between the front output shaft 28 of the transfer case 30 and an input shaft 16 (see FIG. 1) of a front axle assembly 18 to rotatably drive the front axle assembly 18 and, therefore, the front wheels 2 of the vehicle. Similarly, a rear auxiliary driveshaft 4 is connected between the rear output shaft 29 of the transfer case 30 and an input shaft (not shown) of a rear axle assembly 5 to rotatably drive the rear axle assembly 5 and, therefore, the rear wheels 3 of the vehicle. However, the invention can also be used on front wheel drive vehicles, rear wheel drive vehicles, or other types of vehicles in which a drive train assembly is provided for transmitting rotational power from a source of rotational power to at least one rotatably driven vehicle wheel.

In the embodiment shown, the drive train assembly includes a front auxiliary driveshaft 12. The driveshaft 12 typically includes a main tubular portion 14 which is in the shape of an elongated cylindrical tube having a generally continuous cross-section. The shape and size of the driveshaft 12 are typical of propeller shafts, although other shapes and sizes of driveshafts could also be used depending on the particular drive train assembly.

The driveshaft 12 is connected to an input shaft 16 of a front axle assembly 18. The front axle assembly 18 is conventional in the art. The driveshaft 12 is connected to the front axle assembly 18 by the use of a universal joint, indicated generally at 20. The universal joint 20 is conventional in the art and includes a yoke portion 22 of the driveshaft 12 which is attached to one end of the main tubular portion 14, such as by a weld. The universal joint 20 also includes a second yoke portion 24 which is attached to the input shaft 16 of the front axle assembly 18. A cross 26 is mounted between the two yoke portions 22 and 24. The universal joint 20 provides a rotational driving connection between the driveshaft 12 and the input shaft 16 of the front axle assembly 18 while accommodating a limited amount of angular misalignment between their rotational axes.

The driveshaft 12 is also connected to a front output shaft 28 of a transfer case 30. In a typical drive train assembly (not shown), a front auxiliary driveshaft would be connected between a transfer case and a front axle assembly by the use of universal joints at both ends of the driveshaft. In contrast, the drive train assembly of this invention includes a connecting structure, indicated generally at 32, which is used in place of a universal joint at one end of the driveshaft 12. The connecting structure 32 includes a male splined member, the driveshaft 12 in the embodiment shown, and a female splined member, the front output shaft 28 of the transfer case 30 in the embodiment shown. Alternatively, the front output shaft 28 could be the male splined member while the driveshaft 12 is the female splined member. At least one of the splined members is a driveshaft which is usually located completely outside of the source of rotational power of the drive train assembly. In another alternate embodiment, the connecting structure 32 could be used to replace the universal joint 20 between the driveshaft 12 and the front axle assembly 18.

In the preferred embodiment shown in FIG. 1, the driveshaft 12 includes a male splined end portion 34, and a neck portion 36 between the male splined end portion 34 and the main tubular portion 14 of the driveshaft 12. The neck portion 36 has a diameter which is less than the diameters of both the male splined end portion 34 and the main tubular portion 14. As shown in FIGS. 1–4, the preferred driveshaft 12 includes an end piece 38 which is attached to the main tubular portion 14 of the driveshaft 12. The end piece 38 includes the male splined end portion 34 and a tube seat portion 40 which is attached to the main tubular portion 14. The end piece 38 also includes the neck portion 36 which has a diameter less than the diameters of both the male splined end portion 34 and the tube seat portion 40. In the embodiment shown, the male splined end portion 34 has a diameter which is smaller than the diameter of the tube seat portion 40.

The end piece 38 can be attached to the main tubular portion 34 of the driveshaft 12 by any suitable method. For example, a conventional welding technique can be used to permanently join the driveshaft parts together. As is well known, conventional welding techniques involve the application of heat to localized areas of two metallic members, which results in a coalescence of the two metallic members. Such welding may or may not be performed with the application of pressure, and may or may not include the use of a filler metal. Typically, if the end piece 38 is attached to the main tubular portion 34 by welding, the tube seat portion 40 has a diameter which is slightly more or less than the diameter of the main tubular portion 14, so that the end piece 38 and the main tubular portion 34 overlap in a tight fit.

In a preferred embodiment, the end piece 38 is attached to the main tubular portion 34 of the driveshaft 12 by a magnetically impelled arc butt (MIAB) welding method. In such a welding method, the tube seat portion 40 of the end piece 38 has the same diameter as the main tubular portion 14. The tube seat portion 40 and the main tubular portion 14 are forced together while applying a DC welding current. The end piece 38 and the main tubular portion 14 are then moved apart to a distance of 1–3 millimeters in order to strike an arc. This arc is rotated at high speed around the circumference of the weld interface using a static radial magnetic field which can be generated using permanent magnets or electromagnets. Arc rotation is sustained for a few seconds until the ends of the tube seat portion 40 and the main tubular portion 14 are heated to a high temperature or are molten. The tube seat portion 40 and the main tubular portion 14 are then brought rapidly together under a predetermined pressure and the arc is extinguished. The molten metal at the weld interface is expelled and a solid phase weld results from sustained pressure, which consolidates the joint.

Any appropriate materials may be used for making the main tubular portion 14, the yoke portion 22 and the end piece 38 of the driveshaft 12. The use of steel, aluminum, magnesium, and alloys of these materials, as well as composite materials, are all within the scope of the invention. In a preferred embodiment, the end piece 38 is made from a case hardened steel, preferably a high-strength grade of steel with a wear-resistant surface. The material could also be a lesser grade steel with a surface treatment to strengthen the surface. In an alternate embodiment, the male splined end portion 34 of the driveshaft 12 is made from a material which is different from the material used to make the main tubular portion 14. The material used to make the male splined end portion 34 may be stronger and/or more wear-resistant than the main tubular portion 14 to better withstand the stresses at the splined connection. In one such embodiment (not shown), the male splined end portion is formed as a ring having splines on its outer circumferential surface, and the ring is attached to the main tubular portion by any suitable method, such as by welding.

As shown in FIG. 1, a seal 42 is provided to cover the connecting structure 32 between the driveshaft 12 and the front output shaft 28 of the transfer case 30, in order to prevent the entry of dirt, water and other contaminants into the connecting structure 32. The seal 42 also allows a limited amount of angular and axial movement between the driveshaft 12 and the front output shaft 28. Any suitable structure and attachment of the seal 42 can be used for this purpose. In the illustrated embodiment, the seal 42 is a flexible boot type seal which is attached at its ends with a pair of clamps 44 to the tube seat portion 40 of the end piece 38 and to the outer circumferential surface of the front output shaft 28.

Figure 6:
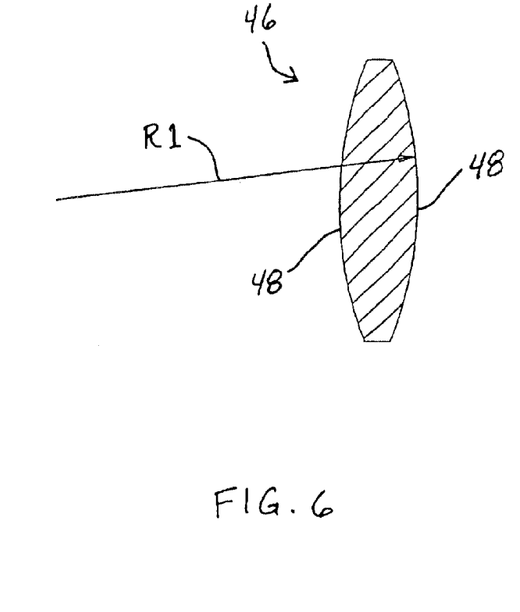
FIG. 6 is a cross-sectional view of a convex spline of the end piece taken along line 6—6 of FIG. 5.
Figure 7:
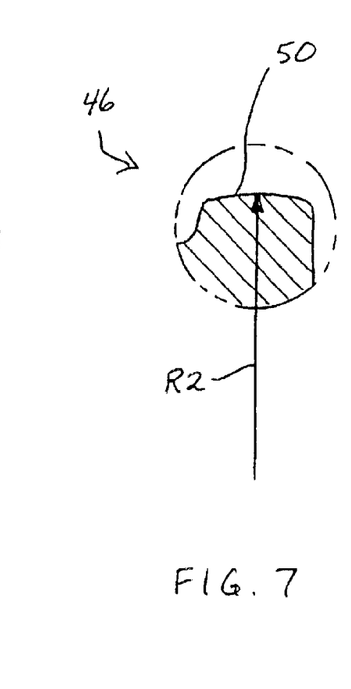
FIG. 7 is a cross-sectional view of a portion of the end piece of FIG. 4, showing a convex spline on the male splined end portion of the end piece.

As shown in FIGS. 1–5, the male splined end portion 34 of the driveshaft 12 has a plurality of outwardly extending longitudinal splines 46 formed on its outer circumferential surface. The splines 46 each have a pair of side surfaces 48 on opposing sides of the spline 46, and a radially outer surface 50. In accordance with the invention, the side surfaces 48 and the outer surfaces 50 of the splines 46 are convex in shape. The convex shape of the splines 46 is best illustrated in FIGS. 6 and 7. As shown in FIG. 6, the spline 46 has a pair of side surfaces 48 on opposing sides of the spline 46. The side surfaces 48 are both convex in shape. In the preferred embodiment, the side surfaces 48 are arcuate or crowned in shape, each forming a smoothly curving arc. As a result, the spline 46 is generally elliptical in shape. The arcuate side surfaces 48 each have a radius R1. As shown in FIG. 7, the spline 46 has a radially outer surface 50. The outer surface 50 is convex in shape. In the preferred embodiment, the outer surface 50 is arcuate or crowned in shape, forming a smoothly curving arc. The arcuate outer surface 50 has a radius R2. The convex splines 46 of the invention contrast with the straight splines used in a slip yoke assembly of a typical drive train assembly.

Figure 8:
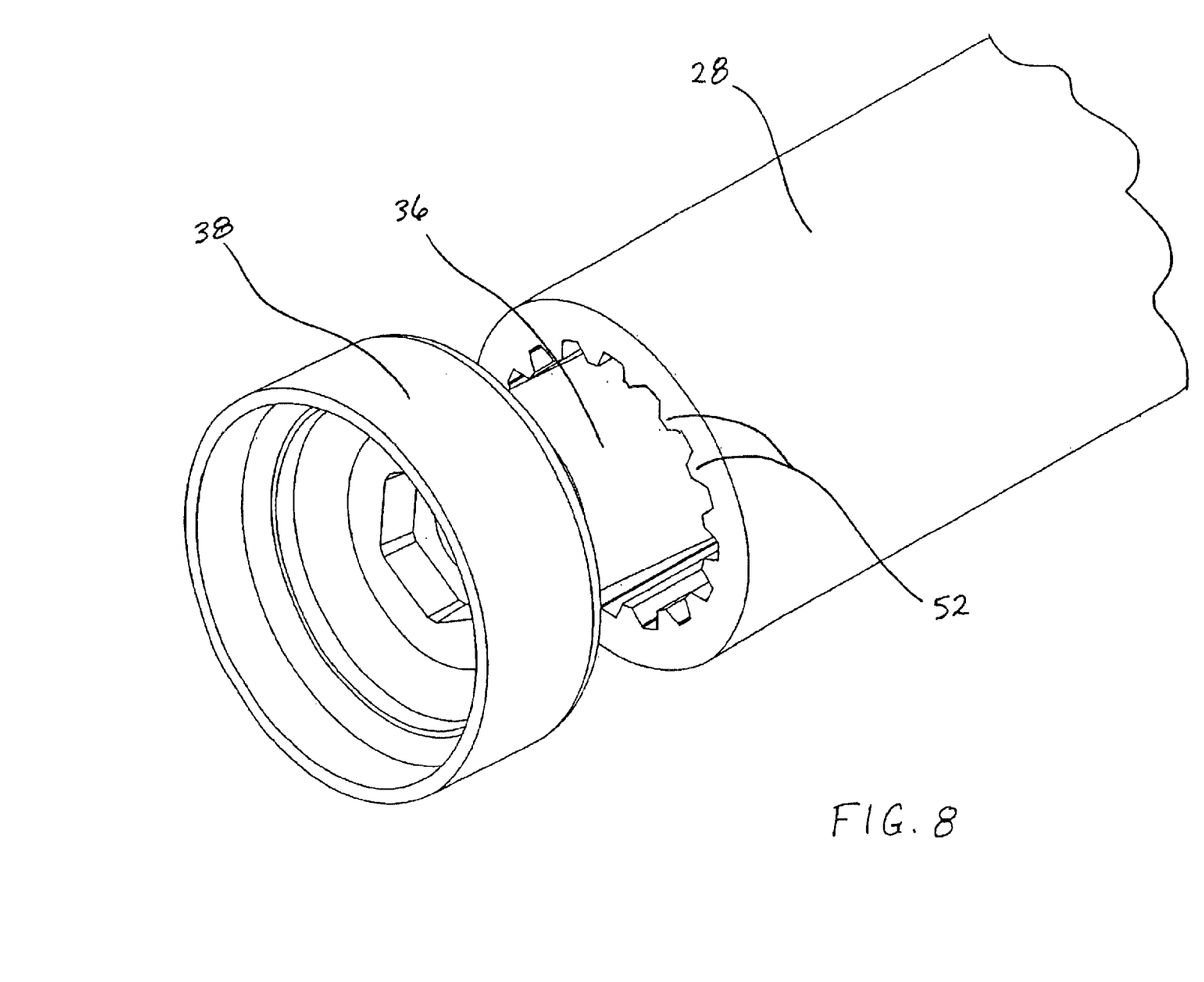
FIG. 8 is a perspective view of the end piece of the driveshaft connected to the input shaft of the front axle assembly.

As shown in FIGS. 1 and 8, the front output shaft 28 of the transfer case 30 has a plurality of inwardly extending splines 52 formed on its inner surface. The outwardly extending splines 46 of the driveshaft 12 cooperate with the inwardly extending splines 52 of the front output shaft 28 to connect the driveshaft 12 to the front output shaft 28 in a manner that allows for limited axial movement therebetween. Moreover, the convex shape of the splines 46 of the driveshaft 12 allows for limited angular movement between the driveshaft 12 and the front output shaft 28. This feature of the invention allows the connecting structure 32 to be used in place of a universal joint in a vehicle drive train assembly. Small amounts of angular and axial movement between the driveshaft 12 and the front output shaft 28 often occur during operation of the vehicle. Such movements may be caused, for example, by up or down movements of the vehicle wheels and axles, a small amount of movement of the vehicle engine in its engine mount, and/or a small amount of frame twisting, which may all be caused by irregularities in the road surface or irregular vehicle operation. A slip yoke assembly of a typical drive train assembly does not allow angular movement between the connected drive train members.

Figure 9:
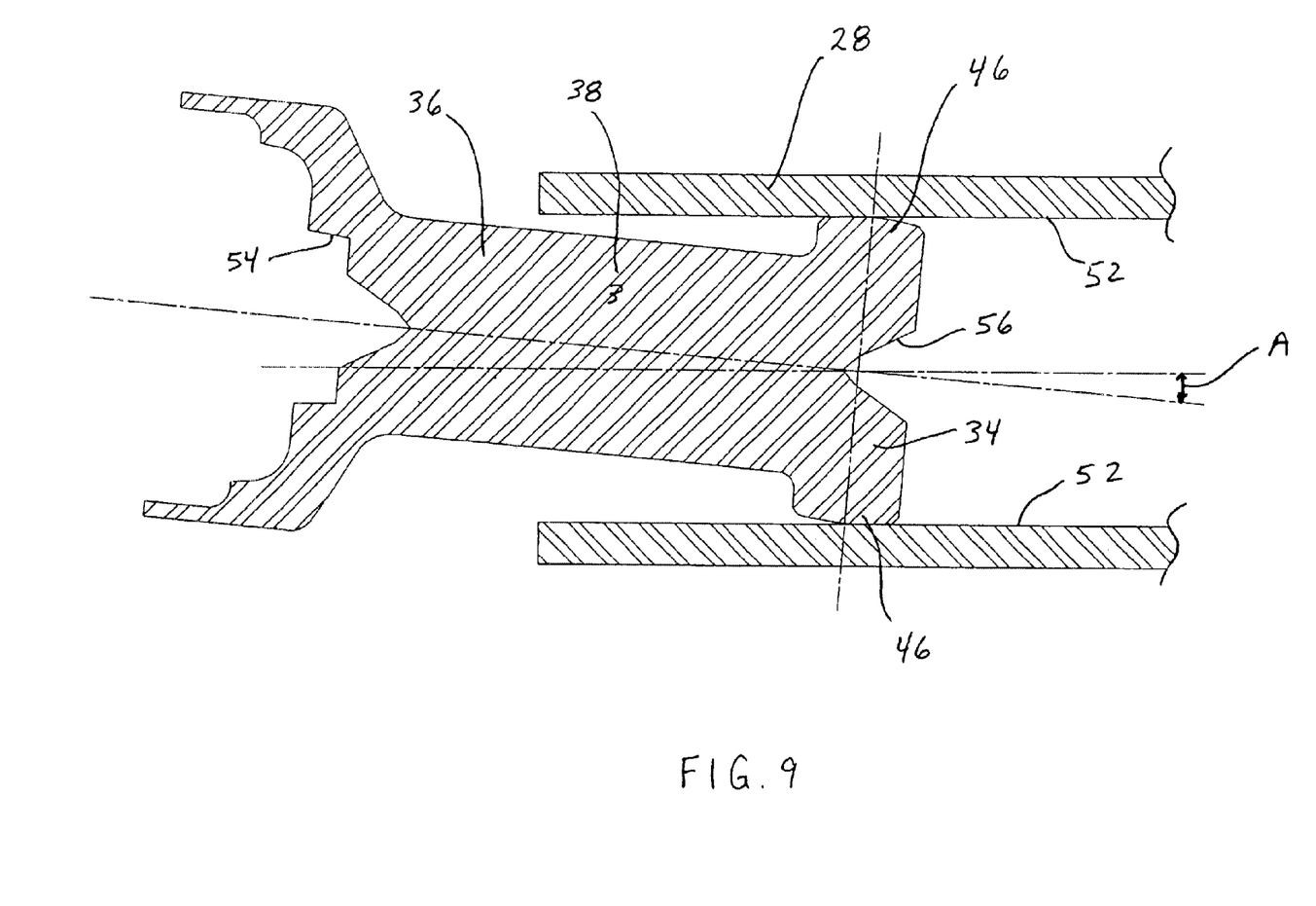
FIG. 9 is a cross-sectional view of the end piece of the driveshaft connected to the input shaft of the front axle assembly.

FIGS. 1, 8 and 9 illustrate the angular connection between the end piece 38 of the driveshaft 12 and the front output shaft 28 of the transfer case 30, allowed by the convex splines 46 of the invention. As shown in FIG. 9, the end piece 38 and the front output shaft 28 are connected at a joint angle A (the angle between the longitudinal axis L1 of the end piece 38 and the longitudinal axis L2 of the front output shaft 28). Preferably, the convex splines 46 are shaped to allow a joint angle of at least about 3°, more preferably at least about 5°, and typically between about 3° and about 7°. It has been determined that the radius R1 (FIG. 6) of each of the convex side surfaces 48 of the spline 46 is the most important structural feature for allowing a desired joint angle. In general, the smaller the radius R1, the larger can be the joint angle. The optimum radius R1 will differ depending on the particular drive train assembly. The radius R2 (FIG. 7) of the convex outer surface 50 of the spline 46 also affects the amount of joint angle allowed. In general, the smaller the radius R2, the larger can be the joint angle. The optimum radius R2 will differ depending on the particular drive train assembly.

In the embodiment shown in FIGS. 8 and 9, the reduced diameter neck portion 36 of the end piece 38 is also important for allowing the angular connection between the end piece 38 of the driveshaft 12 and the front output shaft 28 of the transfer case 30. The neck portion 36 provides clearance for the end of the output shaft 28 to extend inwardly toward the side of the end piece 38 when the two members are angled relative to each other. However, in some embodiments of the invention, a sufficient angular connection can be achieved without the use of a reduced diameter neck portion 36. For example, the male splined end portion 34 of the end piece 38 could be formed with a larger diameter, and/or the male splined end portion 34 could be connected closer to the outer end of the front output shaft 28.

Figure 2:
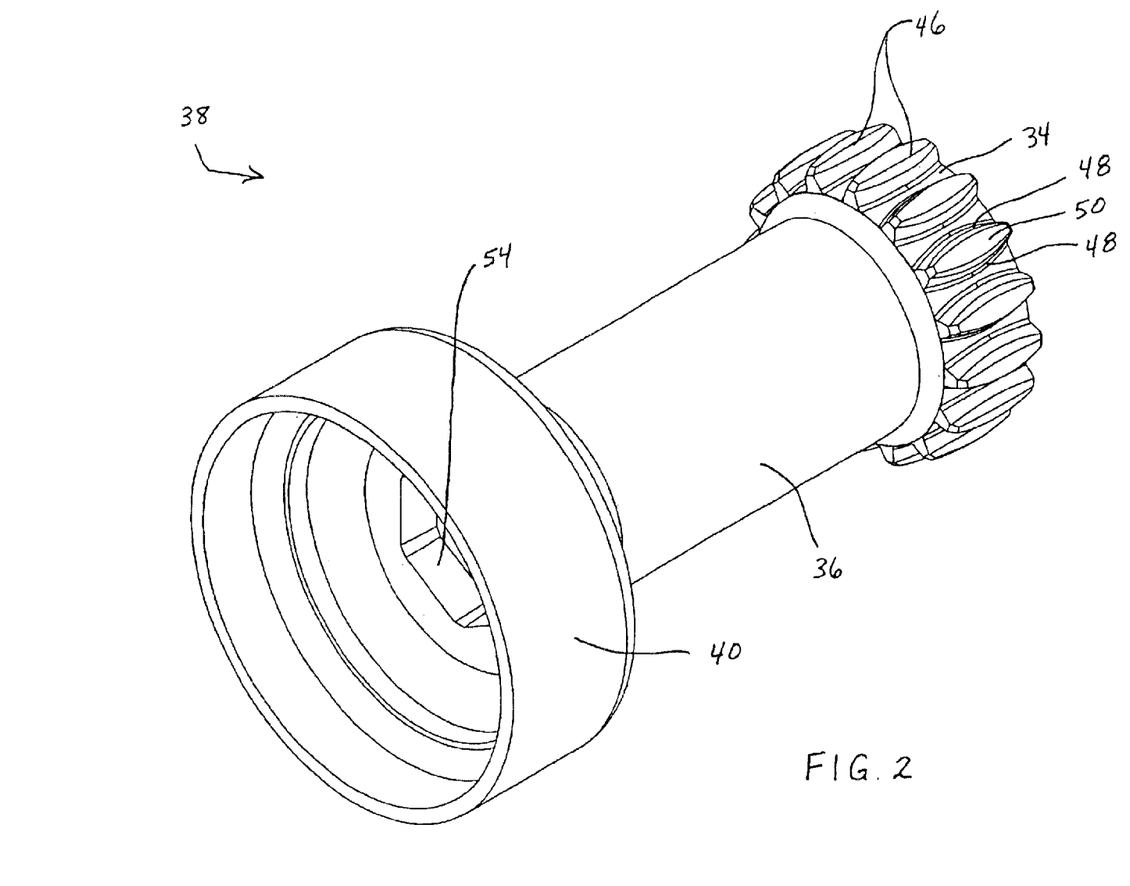
FIG. 2 is an enlarged perspective view of the end piece of FIG. 1.
Figure 3:
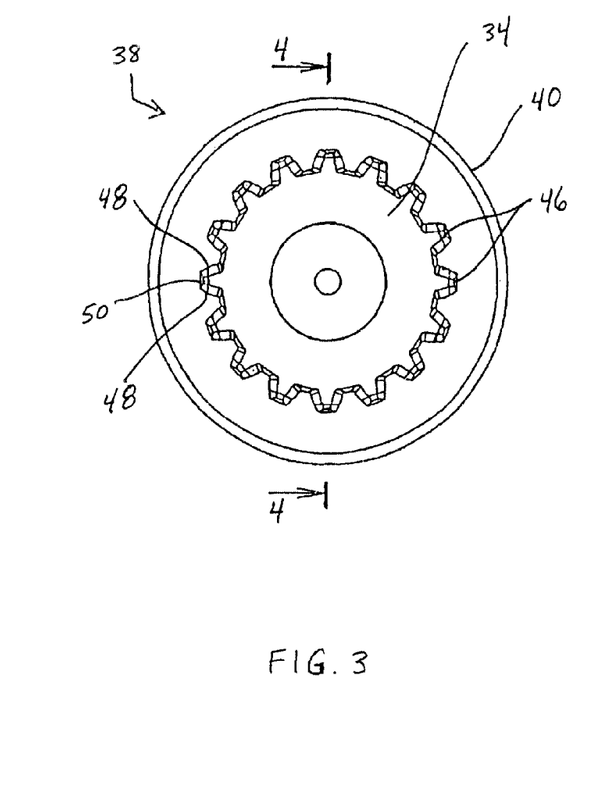
FIG. 3 is a top view of the end piece of FIG. 1.
Figure 4:
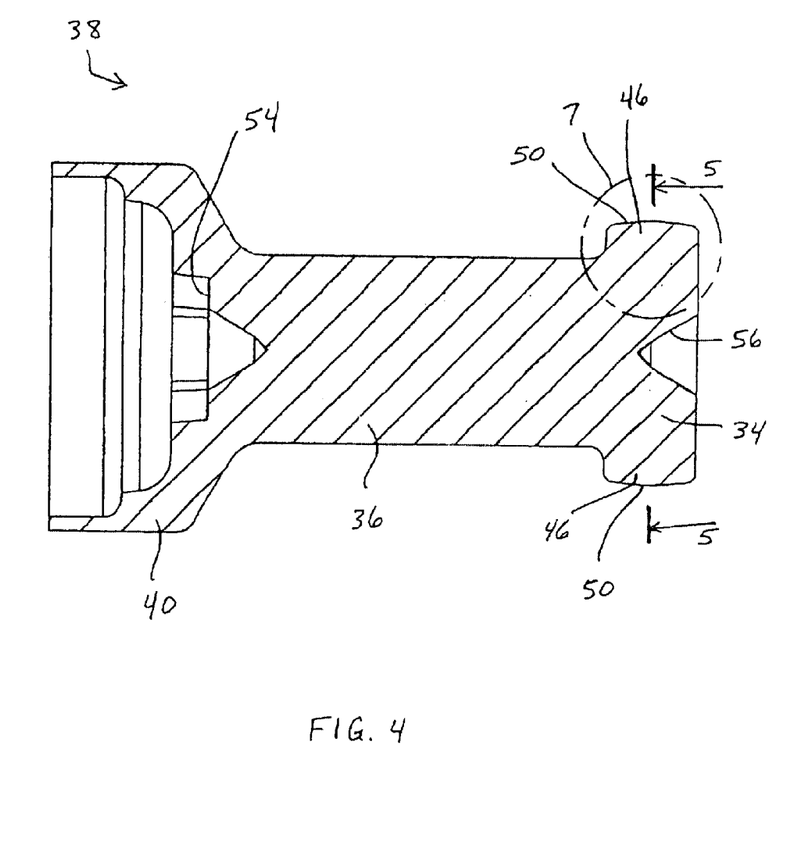
FIG. 4 is a cross-sectional view of the end piece taken along line 4—4 of FIG. 3.
Figure 5:
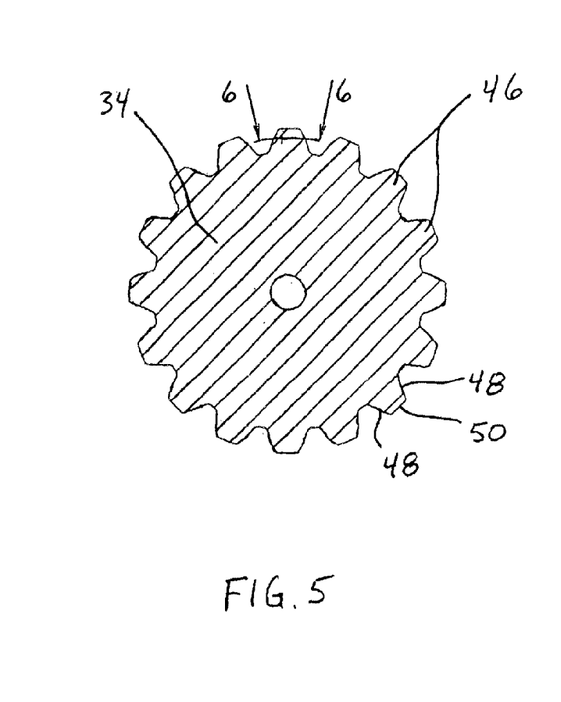
FIG. 5 is a cross-sectional view of a male splined end portion of the end piece taken along line 5—5 of FIG. 4.

Any suitable method can be used to manufacture the end piece 38 including the male splined end portion 34 having the convex splines 46, the neck portion 36 and the tube seat portion 40. Preferably, the end piece 38 is manufactured using a forming operation, such as a forging operation or a rolling operation. In one embodiment, a hot metal blank is forged into the rough shape of the end piece 38. A recess having a hexagonal outer portion and a conical inner portion is formed in one end of the blank, and a conical recess is formed in the other end of the blank. FIGS. 2 and 4 show a hexagonal recess 54 and a conical recess 56 formed in the opposing ends of the end piece 38. The formed piece is mounted on a lathe; the recesses 54 and 56 enable the lathe to hold and center the formed piece. The lathe has a rotatable drive member having a hexagonal end portion, which extends into the hexagonal recess 54 to drive the formed piece to rotate. The lathe machines the outer surface of the formed piece to produce its final shape except for the convex splines. In production, an automated turning center would typically be used for machining instead of a lathe. Alternatively, a net forming process could be used instead of the forging process followed by the machining process. After the machining operation, the convex splines 46 are created by a machining process which uses a suitable tool, such as a gear hobbing, to cut the splines into the desired shape. Alternatively, the splines could be created by a forming operation such as roll forming.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle drive train assembly comprising:
   a source of rotational power;
   a rotatably driven front axle including at least one rotatably driven front vehicle wheel and a rotatably driven rear axle including at least one rotatably driven rear vehicle wheel; and a transfer case that transmits rotational power from the source of rotational power to the front and rear axles, wherein the transfer case includes a male splined member that is connected between the transfer case and the front axle and a female splined member that is provided on either the transfer case or the front axle to transmit rotational power therebetween, the male splined member including a main tubular portion, a male splined end portion, and a neck portion between the male splined end portion and the main tubular portion, the neck portion having a diameter which is less than the diameters of both the male splined end portion and the main tubular portion, the splines of the male splined member having side surfaces which are convex in shape and outer surfaces which are convex in shape, the convex splines of the male splined member cooperating with splines provided on the female splined member to connect the male splined member and the female splined member together in a manner that allows for limited angular and axial movement therebetween.

2. The drive train assembly defined in claim 1 wherein the convex splines are shaped to allow a joint angle between the male splined member and the female splined member of at least about 3°.

3. The drive train assembly defined in claim 1 wherein the convex splines are generally elliptical in shape.

4. The drive train assembly defined in claim 1 wherein the driveshaft includes the main tubular portion and an end piece attached to the main tubular portion, the end piece including the male splined end portion, a tube seat portion which is attached to the main tubular portion, and the neck portion between the male splined end portion and the tube seat portion.

* * * * *